(12) United States Patent
Hwang et al.

(10) Patent No.: US 10,640,646 B2
(45) Date of Patent: May 5, 2020

(54) FLAME RETARDANT POLYURETHANE ARTIFICIAL LEATHER AND METHOD FOR MANUFACTURING THE SAME

(71) Applicants: Hyundai Motor Company, Seoul (KR); Kia Motors Corporation, Seoul (KR)

(72) Inventors: Hye-Na Hwang, Ulsan (KR); Sung-Joon Hong, Seoul (KR); Han-Seok Kim, Seoul (KR); Kyung-Nam Kim, Seoul (KR); Seong-Ho Cho, Hwaseong-si (KR); Yoon-Jong Cha, Incheon (KR); Sung-Deuk An, Gunpo-si (KR)

(73) Assignees: Hyundai Motor Company, Seoul (KR); Kia Motors Corporation, Seoul (KR); Baiksan Co., Ltd., Siheung-si (KR)

( * ) Notice: Subject to any disclaimer, the term of this patent is extended or adjusted under 35 U.S.C. 154(b) by 0 days.

(21) Appl. No.: 15/858,554

(22) Filed: Dec. 29, 2017

(65) Prior Publication Data
US 2018/0237637 A1 Aug. 23, 2018

(30) Foreign Application Priority Data
Feb. 17, 2017 (KR) .......................... 10-2017-0021666

(51) Int. Cl.
*C08L 75/04* (2006.01)
*C09D 175/04* (2006.01)
(Continued)

(52) U.S. Cl.
CPC .............. *C08L 75/04* (2013.01); *C08K 3/016* (2018.01); *C08K 3/22* (2013.01); *C08K 5/0066* (2013.01); *C08K 5/5399* (2013.01); *C09D 175/04* (2013.01); *C09J 175/04* (2013.01); *C08K 2003/2227* (2013.01); *C08L 2201/02* (2013.01)

(58) Field of Classification Search
CPC ... C08L 75/04; C08L 2201/02; C09D 175/04; C09J 175/04; C08K 5/5399; C08K 5/0066; C08K 3/22; C08K 3/016; C08K 2003/2227
See application file for complete search history.

(56) References Cited

U.S. PATENT DOCUMENTS
2017/0225438 A1* 8/2017 Maclure .................. D06N 3/14

FOREIGN PATENT DOCUMENTS
CN 103993482 A 8/2014
JP S 61-28079 A 2/1986
(Continued)

OTHER PUBLICATIONS
English Machine Translation of KR100446465 (Year: 2001).*

*Primary Examiner* — Andrew J. Oyer
(74) *Attorney, Agent, or Firm* — Morgan, Lewis & Bockius LLP (57) ABSTRACT

Provided herein is a flame retardant polyurethane (PU) artificial leather and a method for manufacturing the flame retardant polyurethane (PU) artificial leather, wherein the method may include preparing a microfiber nonwoven fabric material, consecutively forming a polyurethane coating layer and an adhesive layer on one surface of a release paper, and combining the nonwoven fabric material and the release paper.

8 Claims, 5 Drawing Sheets

(51) Int. Cl.
*C09J 175/04* (2006.01)
*C08K 3/016* (2018.01)
*C08K 3/22* (2006.01)
*C08K 5/00* (2006.01)
*C08K 5/5399* (2006.01)

(56) References Cited

FOREIGN PATENT DOCUMENTS

| | | | |
|---|---|---|---|
| JP | 2016-079375 A | | 5/2016 |
| KR | 20010079335 | * | 1/2001 |
| KR | 10-0481581 B1 | | 12/2005 |
| KR | 10-2009-0006645 A | | 1/2009 |

* cited by examiner

FLAME RETARDANT POLYURETHANE ARTIFICIAL LEATHER AND METHOD FOR MANUFACTURING THE SAME

CROSS-REFERENCE(S) TO RELATED APPLICATIONS

The present application claims priority to Korean Patent Application No. 10-2017-0021666, filed on Feb. 17, 2017, the entire contents of which is incorporated herein for all purposes by this reference.

BACKGROUND OF THE INVENTION

Field of the Invention

The present invention relates to flame retardant PU artificial leather and a method for manufacturing the same, and in particular, to flame retardant PU artificial leather including aluminum hydroxide in a polyurethane resin impregnated in a microfiber nonwoven fabric as a flame retardant for enhancing flame retardancy, and including a phosphorous-based flame retardant in an adhesive with a surface coating layer, and a method for manufacturing the same.

Description of Related Art

Artificial leather formed with a nonwoven fabric having microfibers three-dimensionally bridging and a polymer elastic body impregnated in the nonwoven fabric has excellent touch, light effect, drape property and the like, and has a soft texture similar to natural leather and unique appearances, and has been widely used as seat surface materials or interior materials of transportation means such as automobiles, airplanes, trains and ships (hereinafter, abbreviated as "vehicles").

Artificial leather is normally manufactured using processes of preparing a nonwoven fabric with microfibers or composite fibers capable of becoming microfibers, and is, impregnating a polymer elastic body into the nonwoven fabric, and treating the result with an aqueous alkali solution or an organic solvent to make the composite fibers to microfibers, and then continuously buffing and dyeing the fiber.

However, since artificial leather is formed with a nonwoven fabric formed with microfibers and a porous polyurethane resin impregnated in the nonwoven fabric, oxygen is smoothly supplied during combustion, and the microfibers perform a role of a wick and the porous polyurethane and a softener perform a role of gas making the artificial leather very vulnerable to the fire.

Current methods of impregnating a nonwoven fabric in a solution include a bromine-based flame retardant. However, bromine-based flame retardants are highly toxic and the use is under restrictions by current regulations, or restrictions are anticipated in the future. Other methods for providing a flame retardant artificial leather include coating the surface of the artificial leather with a flame retardant solution. Methods of coating a polymer resin containing a flame retardant on the back side of artificial leather are problematic because the resulting artificial leather feels hard due to the large quantities of flame retardant needed to be used for obtaining flame retardancy, and also the appearance of the artificial leather becomes poor. PU artificial leather is particularly problematic as an additional flame retarding process is required to provide sufficient flame retardancy as the flame retardant moves to a surface of the artificial leather.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing flame retardant PU artificial leather including an aluminum hydroxide-based flame retardant instead of a bromine-based flame retardant in a polyurethane resin impregnated in a microfiber nonwoven fabric for enhancing flame retardancy of the PU artificial leather. In various exemplary embodiments, the flame retardant PU artificial leather also includes a phosphorous-based flame retardant in an adhesive with a surface coating layer. The PU artificial leather described herein enhances flame retardancy by adjusting the content of each of the flame retardants. Also provided herein is a method for manufacturing the same.

However, objects of the present invention are not limited to the object described above, and other objects that are not mentioned will be clearly understood to those skilled in the art from the descriptions provided below.

A method for manufacturing flame retardant PU artificial leather according to an exemplary embodiment of the present invention may include preparing a microfiber nonwoven fabric material; consecutively forming a polyurethane coating layer and an adhesive layer on one surface of a release paper; and combining the nonwoven fabric material and the release paper.

The preparing of a microfiber nonwoven fabric material may include impregnating a nonwoven fabric into a polyurethane resin including a first flame retardant; and treating the impregnated nonwoven fabric with an alkali solvent to reduce the weight.

The polyurethane resin may include the first flame retardant in 40 parts per hundred parts of resin (PHR) to 50 PHR (e.g., 40 PHR, 41 PHR, 42 PHR, 43 PHR, 44 PHR, 45 PHR, 46 PHR, 47 PHR, 48 PHR, 49 PHR, or 50 PHR).

The first flame retardant may be aluminum hydroxide ($Al(OH)_3$).

The adhesive layer may include a second flame retardant in 20 PHR to 30 PHR (e.g., 20 PHR, 21 PHR, 22 PHR, 23 PHR, 24 PHR, 25 PHR, 26 PHR, 27 PHR, 28 PHR, 29 PHR, or 30 PHR).

The second flame retardant may be a phosphorous-based flame retardant.

The second flame retardant may be a non-soluble flame retardant having phosphorous content of about 10% by weight or higher (e.g., about 10% by weight, about 15% by weight, about 20% by weight, about 25% by weight, about 30% by weight, about 35% by weight, about 40% by weight, about 45% by weight, about 50% by weight, or more) and alkalinity resistance of about 60% or higher (e.g., about 60%, about 65%, about 70%, about 75%, about 80%, about 85% or higher).

The second flame retardant may be a powder-type flame retardant.

The second flame retardant may be bis-amide phosphate.

The combining may be combining the adhesive layer and the nonwoven fabric material to be in contact with each other.

Flame retardant PU artificial leather according to an exemplary embodiment of the present invention may include a polyurethane resin-impregnated microfiber nonwoven fabric material; and an adhesive layer coated on one surface of the nonwoven fabric material.

The polyurethane resin may include 40 PHR to 50 PHR (e.g., 40 PHR, 41 PHR, 42 PHR, 43 PHR, 44 PHR, 45 PHR, 46 PHR, 47 PHR, 48 PHR, 49 PHR, or 50 PHR) of aluminum hydroxide ($Al(OH)_3$).

The adhesive layer may include 20 PHR to 30 PHR (e.g., 20 PHR, 21 PHR, 22 PHR, 23 PHR, 24 PHR, 25 PHR, 26 PHR, 27 PHR, 28 PHR, 29 PHR, or 30 PHR) of a phosphoric acid ester-based flame retardant.

The flame retardant may be bis-amide phosphate.

It is to be understood that both the foregoing general description and the following detailed description of the present invention are exemplary and explanatory and are intended to provide further explanation of the invention as claimed.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DESCRIPTION OF EMBODIMENTS

Terms or words used in the present specification and the claims are not to be interpreted limitedly to common or dictionary meanings, and shall be interpreted as meanings and concepts corresponding to technological ideas of the present invention based on a principle in which the inventors may suitably define the concepts of terms in order to describe the invention in the best possible way. Accordingly, embodiments described in the present specification and constitutions illustrated in the drawings are just most exemplary embodiments of the present invention and do not represent all technological ideas of the present invention, and therefore, it is to be understood that various equivalents and modified examples capable of replacing the embodiments may be present at the time of application. In addition, detailed descriptions on known functions and constitutions that may unnecessarily evade the gist of the present invention will not be included. Hereinafter, exemplary embodiments of the present invention will be described in detail with reference to the attached drawings.

Figure 1:
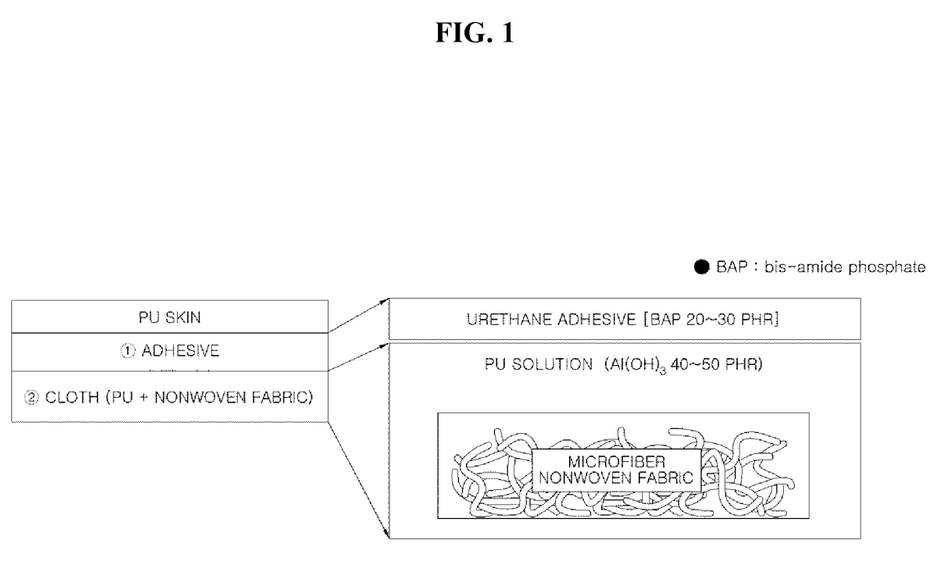
FIG. 1 is a diagram schematically illustrating a constitution of flame retardant PU artificial leather according to an exemplary embodiment of the present invention.

FIG. 1 is a diagram schematically illustrating a constitution of flame retardant PU artificial leather according to an exemplary embodiment of the present invention. First, PHR in an exemplary embodiment of the present invention is parts per hundred parts of resin and represents content of each component per 100 of resin.

When referring to FIG. 1, flame retardant PU artificial leather according to an exemplary embodiment of the present invention may be formed including a pattern processible surface coating layer, a microfiber nonwoven fabric material layer, and an adhesive layer adhering these.

Figure 2:
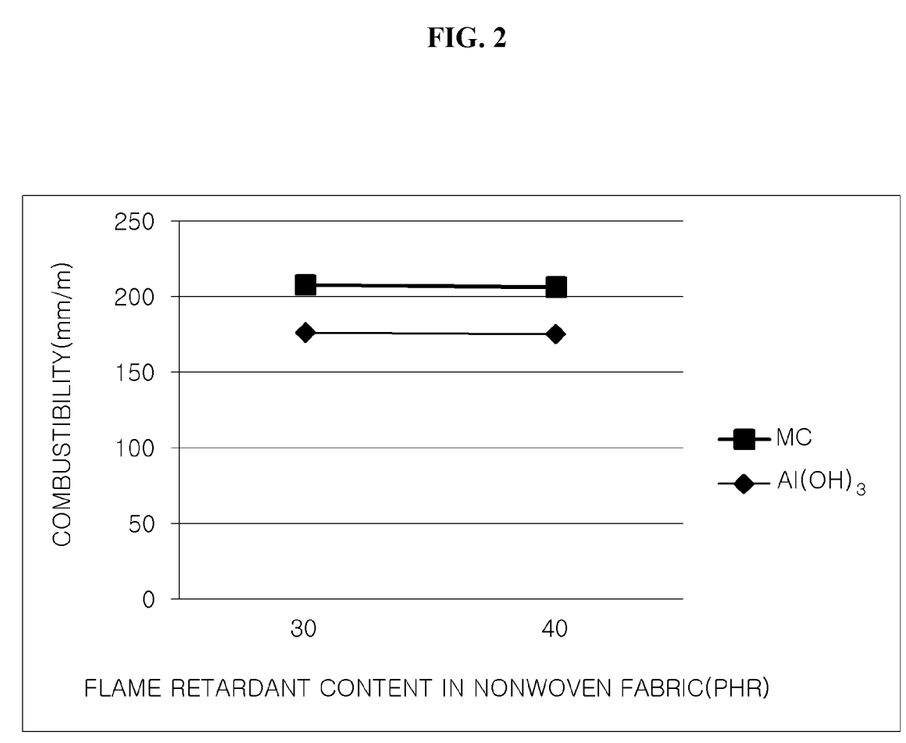
FIG. 2 is a graph showing test results on combustibility depending on the content of aluminum hydroxide used as a flame retardant in an exemplary embodiment of the present invention.

The surface coating layer may be coated with a polyurethane resin, and the nonwoven fabric material layer may use a nonwoven fabric formed with sea fibers of regular polyester and island fibers of regular polyamide. This nonwoven fabric is impregnated into a polyurethane resin, and herein, the polyurethane resin may include aluminum hydroxide ($Al(OH)_3$) as a flame retardant. This is, as identified in the following Table 1 testing the degree of decomposition for an alkali solvent (e.g., NaOH) in a weight reduction process for making the nonwoven fabric microfibers to be described below, due to the fact that aluminum hydroxide has an almost identical degree of decomposition with decabromodiphenyl ethane (DBDPE), an existing bromine-based flame retardant. In addition, as shown in FIG. 2, it was identified that aluminum hydroxide has more superior flame retardancy compared to MC having a similar degree of decomposition to $Al(OH)_3$. In the following Table 1, the weight of residual quantity (g) was measured by treating for 30 minutes under 2.5% of NaOH solution and 90° C., an existing weight reduction condition, and then filtering.

TABLE 1

| No. | Flame Retardant | First (g) | Second (g) | Average (g) |
|---|---|---|---|---|
| 1 | DBDPE (Decabromodiphenyl Ethane) | 98.79 | 98.66 | 98.725 |
| 2 | $Al(OH)_3$ | 96.16 | 98.27 | 97.215 |
| 3 | MC (Melamine Cyanurate) | 96.47 | 93.32 | 94.895 |
| 4 | TBC (Tris(2,3-dibromopropyl) | 88.83 | 97.72 | 93.275 |
| 5 | AP (Ammonium Polyphosphate) | 90.42 | 92.9 | 91.66 |
| 6 | MPP (Melamine Polyphosphate) | 88.46 | 87.99 | 88.225 |
| 7 | BAP | 93.78 | 78.75 | 86.265 |
| 8 | ADP (Aluminum Diethyl Phosphinate) | 81.15 | 89.1 | 85.125 |
| 9 | $Mg(OH)_2$ | 84.24 | 85.79 | 85.015 |
| 10 | OP950 (Zinc Diethyl Phosphinate) | 60.97 | 61.54 | 61.255 |

Herein, the aluminum hydroxide ($Al(OH)_3$) is preferably included in greater than or equal to 40 PHR and less than 50 PHR. Being included in 50 PHR or greater may cause problems in PU artificial leather qualities and processes such as surface efflorescence, hydrolysis and excessive powder in processes, and being included in less than 40 PHR may cause a problem of reducing flame retardancy.

In addition, the adhesive layer may additionally include a flame retardant for supplementing flame retarding performance of PU artificial leather. Herein, as the adhesive layer, using a phosphorous-based, more specifically, bis-amide phosphate (hereinafter, BAP) that is a phosphoric acid ester-based flame retardant, is preferred. This is due to the fact that BAP has phosphorous content of 10% by weight or higher, has alkalinity resistance of 60% or higher, and is insoluble in water, and therefore, does not cause a problem of being dissolved in water after drying, and has favorable compatibility with urethane. When including BAP in less than 20 PHR, the flame retarding effect is not high, and therefore, including BAP in 20 PHR or greater is preferred in order to satisfy 50 (mm/minute), a target combustibility level. However, even when included in greater than 20 PHR, the effect of improving flame retardancy is insignificant considering the amount used, and therefore, including in 20 PHR may be more preferred.

Figure 3:
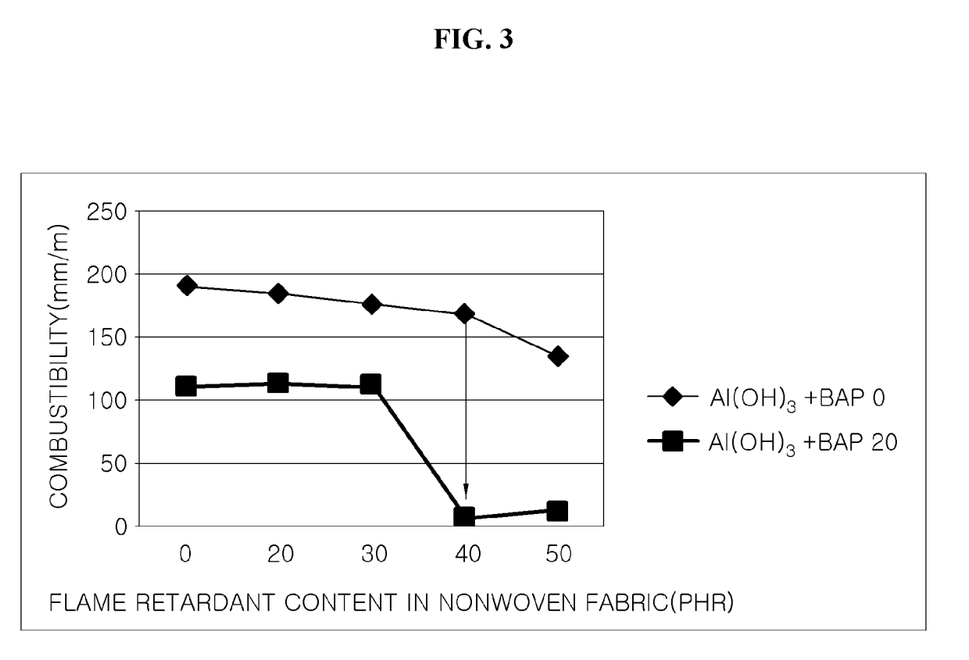
FIG. 3 is a graph showing an effect of enhancing flame retardancy depending on the content of aluminum hydroxide in an exemplary embodiment of the present invention.

FIG. 3 is a graph showing an effect of enhancing flame retardancy depending on the content of aluminum hydroxide in an exemplary embodiment of the present invention.

When referring to FIG. 3, it is identified that 50 (mm/minute), a target combustibility level, is satisfied when including aluminum hydroxide in 40 PHR or greater together with 20 PHR of BAP used in the adhesive layer in the nonwoven fabric. However, even when including aluminum hydroxide in greater than 40 PHR, the effect of improving flame retardancy is insignificant considering the amount used, and therefore, including in 40 PHR may be more preferred.

Figure 5:
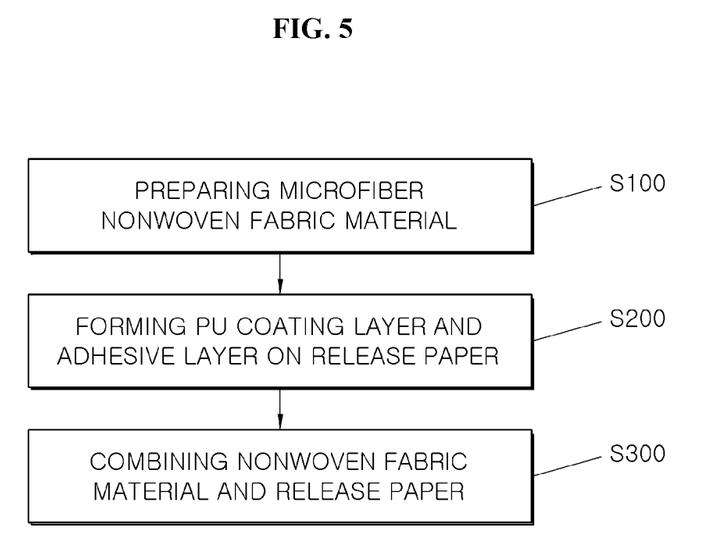
FIG. 5 is a flow chart illustrating a method for manufacturing flame retardant PU artificial leather according to an exemplary embodiment of the present invention.

FIG. 5 is a flow chart illustrating a method for manufacturing flame retardant PU artificial leather according to an exemplary embodiment of the present invention.

When referring to FIG. 5, a method for manufacturing flame retardant PU artificial leather according to an exemplary embodiment of the present invention may include preparing a microfiber nonwoven fabric material (S100); consecutively forming a polyurethane coating layer and an adhesive layer on one surface of a release paper (S200); and combining the nonwoven fabric material and the release paper (S300).

Herein, the preparing of a microfiber nonwoven fabric material (S100) may include impregnating a nonwoven fabric into a polyurethane resin including a first flame retardant; and treating the impregnated nonwoven fabric with an alkali solvent to reduce the weight.

As described above, the polyurethane resin may include aluminum hydroxide (Al(OH)$_3$) as the first flame retardant instead of a bromine-based flame retardant, and herein, the aluminum hydroxide is preferably included in greater than or equal to 40 PHR and less than 50 PHR. Being included in 50 PHR or greater may cause problems in PU artificial leather qualities and processes such as surface efflorescence, hydrolysis and excessive powder in processes, and being included in less than 40 PHR may cause a problem of reducing flame retardancy.

More specifically, in an exemplary embodiment of the present invention, 40 PHR of aluminum hydroxide, 200 PHR of N,N-dimethylformamide (DMF), 1 PHR of an additive and 5 PHR of a toner are further included in 100 PHR of the polyurethane resin for oil impregnation in addition to the aluminum hydroxide, and based on the total mixing amount, the polyurethane resin for oil impregnation, the DMF, the additive, the toner and the aluminum hydroxide are weighed in a mixing container according to the mixing ratio, and the weighed mixed solution is sufficiently mixed for 1 hour at a stirring rate of 700 RPM so that aluminum hydroxide agglomeration does not occur. The sufficiently mixed PU impregnated solution is filtered with a filter element, and then a visual inspection on contamination, foreign substances, aluminum hydroxide agglomeration and the like is progressed. The use of the polyurethane resin for impregnation completed with the inspection is preferably finished within 10 hours, and this is due to a combustibility deviation that may occur from aluminum hydroxide precipitation. In addition, the polyurethane resin mixed as above needs to have no contamination, foreign substances and aggregation occurring from aluminum hydroxide addition, and needs to maintain viscosity that meets the standard requirement.

By treating the polyurethane resin-impregnated nonwoven fabric including the first flame retardant with an alkali solvent such as NaOH, polyester, a sea fiber, is eluted, and microfibers are obtained.

Figure 4:
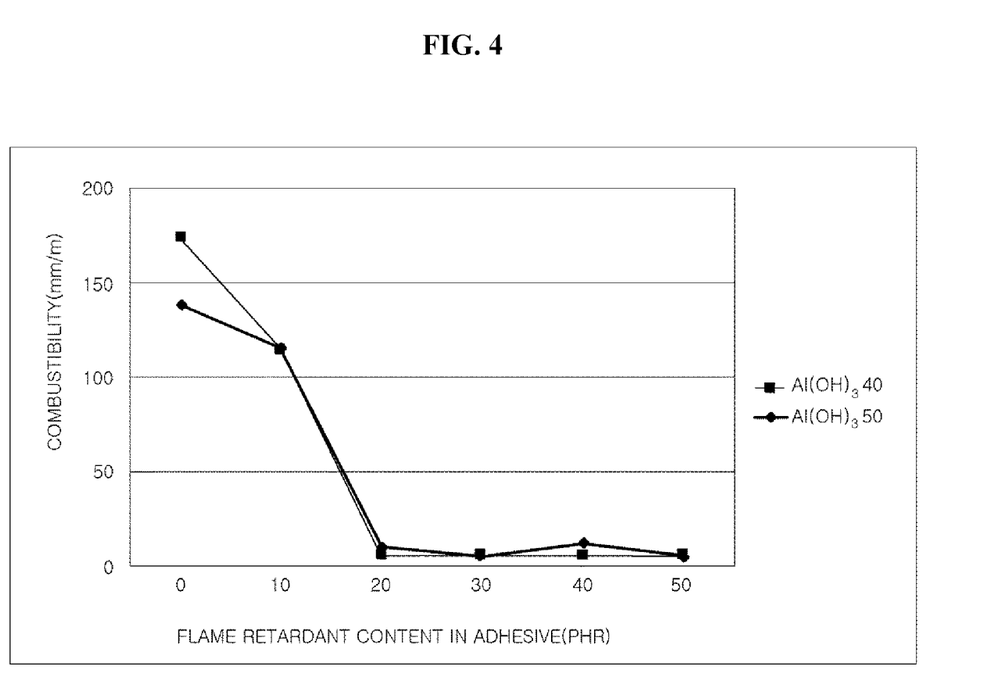
FIG. 4 is a graph showing test results on combustibility depending on the content of bis-amide phosphate included in an adhesive layer in an exemplary embodiment of the present invention.

However, sufficient flame retardancy is not secured with just the first flame retardant in the polyurethane resin impregnated in the microfiber nonwoven fabric, and the adhesive layer preferably includes a second flame retardant as well. Herein, the second flame retardant preferably uses a phosphorous-based, more specifically, bis-amide phosphate (BAP) that is a phosphoric acid ester-based flame retardant, in a powder form. This is due to the fact that BAP has phosphorous content of 10% by weight or higher, has alkalinity resistance of 60% or higher, and is insoluble in water, and therefore, do not cause a problem of being dissolved in water after drying, and has favorable compatibility with urethane. When referring to FIG. 4, the flame retarding effect is not high when including BAP in less than 20 PHR, and therefore, including BAP in 20 PHR or greater is preferred, however, including BAP in 30 PHR or greater may cause a problem of decreasing adhesive strength, and therefore, BAP is more preferably included in greater than or equal to 20 PHR and less than 30 PHR.

More specifically, in an exemplary embodiment of the present invention, 20 PHR of DMF, 20 PHR of methyl ethyl ketone (MEK), 18 PHR of a crosslinking agent and 3 PHR of an accelerator are further included in 100 PHR of the adhesive resin, and 20 PHR of a phosphorous-based flame retardant (BAP) is included. After each checking the adhesive resin, the resin for oil impregnation, the DMF, the MEK, the crosslinking agent, the accelerator and the phosphorous-based flame retardant are weighed in a mixing container according to the mixing ratio based on the total mixing amount, and the weighed mixed solution is sufficiently mixed for 15 minutes or longer so that the powder-type phosphorous-based flame retardant does not agglomerate. Herein, the adhesive needs to have no contamination, foreign substances, flame retardant agglomeration and the like, and is preferably used immediately after mixing. This is for preventing a viscosity increase caused by the crosslinking reaction.

In the combining (S300), the nonwoven fabric material and the coating layer-formed release paper are combined, and therefore, the adhesive layer and the nonwoven fabric material need to be combined so as to be in contact with each other, and after going through drying, steps of removing the release paper and processing patterns on the surface coating layer may be further included.

As the combustibility test in an exemplary embodiment of the present invention, a specimen having a width of 350 mm and a length of 100 mm is used, and a flame is exposed to the specimen for 15 seconds with the flame size being fixed to 38 mm and then removed, and between A and B points on the specimen separated at a distance of 250 mm, the time taken for burning from the A to the B is measured. In the test, self-extinguishable means that the flame goes out before reaching the A point after the flame removal, or the flame goes out within 60 seconds after reaching the A point, and the length of combustion is less than 50 mm.

TABLE 2

| No. | Category | Cloth (PHR) | Adhesive (PHR) | Combustibility Evaluation Result (mm/minute) |
|---|---|---|---|---|
| Comparative Example 1 | Existing Composition | DBDPE + SB2O3 (30 P) | DBDPE (12 P) | Self-extinguishable |
| Comparative Example 2 | Untreated | X | X | 184 to 199 |
| Comparative Example 3 | Treated with Adhesive Only | X | BAP (50 P) | 128 to 157 |
| Comparative Example 4 | Al(OH)$_3$ Effect | Al(OH)$_3$ (30P) | BAP (20 P) | 93 to 113 |
| Example 1 | | Al(OH)$_3$ (40P) | BAP (20 P) | 5 |

Table 2 is a result of testing flame retardancy of the PU artificial leather according to an exemplary embodiment of the present invention. Comparative Example 1 using an existing bromine-based flame retardant is effective as a self-extinguishable material, but has a problem of being subject to legal regulations in the future due to harmful effects to the human body.

In addition, it was identified in Comparative Example 3 that using a phosphorous-based flame retardant (BAP) only on the adhesive was effective. As identified in Table 1, the example of the present invention used Al(OH)$_3$ having excellent alkalinity resistance as a flame retardant impregnated in a nonwoven fabric, and in the example of the present invention, the flame retardant used for impregnation in the nonwoven fabric included Al(OH)$_3$ in 40 PHR or greater, and when including Al(OH)$_3$ in 50 PHR or greater, problems in PU artificial leather qualities and processes such as surface efflorescence, hydrolysis and excessive powder in processes may occur as described above, and therefore, the content is preferably limited to greater than or equal to 40 PHR and less than 50 PHR.

In addition, when referring to the following Table 3 evaluating combustibility for specific flame retardant types and content, an effect of combustibility improvement is not high when including only BAP in the adhesive layer, and when using BAP in the adhesive layer together with aluminum hydroxide in the nonwoven fabric, combustion hardly occurred with average combustibility of 5 mm when the content was 20 PHR or greater, and it was identified that very excellent flame retardancy was secured. In addition, when including aluminum hydroxide in 40 PHR or greater in the nonwoven fabric together with including BAP in 20 PHR or greater in the adhesive layer, very excellent average combustibility was also identified.

TABLE 3

| Fixed Value | Nonwoven Fabric Al(OH)$_3$ (PHR) | Adhesive BAP (PHR) | Combustibility (mm/minute) Evaluation Result | | | | | Average |
|---|---|---|---|---|---|---|---|---|
| No Nonwoven Fabric Treatment | 0 | 0 | 199 | 184 | 190 | | | 191 |
| | 0 | 20 | 108 | 115 | 101 | 112 | | 109 |
| | 0 | 50 | 155 | 128 | 157 | | | 147 |
| BAP 0 (PHR) | 20 | 0 | 172 | 184 | 184 | 197 | | 184 |
| | 30 | 0 | 161 | 182 | 186 | | | 176 |
| | 40 | 0 | 140 | 200 | 171 | 162 | 171 | 169 |
| | 50 | 0 | 159 | 120 | 97 | 162 | 135 | 135 |
| BAP 20 (PHR) | 20 | 20 | 123 | 96 | 119 | | | 112 |
| | 30 | 20 | 93 | 126 | 113 | | | 111 |
| | 40 | 20 | 5 | 5 | 5 | 5 | 5 | 5 |
| | 50 | 20 | 5 | 5 | 28 | 5 | 5 | 10 |
| Al(OH)$_3$ 40 (PHR) | 40 | 0 | 140 | 200 | 171 | 162 | 171 | 169 |
| | 40 | 10 | 83 | 154 | 105 | 110 | 104 | 111 |
| | 40 | 20 | 5 | 5 | 5 | 5 | 5 | 5 |
| | 40 | 30 | 5 | 5 | 5 | 5 | 5 | 5 |
| | 40 | 40 | 5 | 5 | 5 | 5 | 5 | 5 |
| | 40 | 50 | 5 | 5 | 5 | 5 | 5 | 5 |
| Al(OH)$_3$ 50 (PHR) | 50 | 0 | 159 | 120 | 97 | 162 | 135 | 135 |
| | 50 | 10 | 121 | 162 | 5 | 183 | 88 | 112 |
| | 50 | 20 | 5 | 5 | 28 | 5 | 5 | 10 |
| | 50 | 30 | 5 | 5 | 5 | 5 | 5 | 5 |
| | 50 | 40 | 37 | 5 | 5 | 5 | 5 | 11 |
| | 50 | 50 | 5 | 5 | 5 | 5 | 5 | 5 |

As described above, in the manufacture of flame retardant PU artificial leather, there was no loss in the step of weight loss by using aluminum hydroxide as the first flame retardant in the polyurethane resin for impregnation, and by additionally including a phosphorous-based flame retardant (BAP) in the adhesive, an excellent flame retarding effect was obtained. In other words, in the manufacture of flame retardant PU artificial leather, proactive responses may be made to legal regulations since toxic bromine-based based flame retardants are not used, and sufficient effects are obtained without adding a separate flame retarding process.

The present invention includes aluminum hydroxide in a polyurethane resin impregnated in a microfiber nonwoven fabric as a flame retardant, includes a phosphorous-based flame retardant in an adhesive with a surface coating layer, and controls the content of each of the flame retardants, which are affective in enhancing flame retardancy of PU artificial leather.

In addition, aluminum hydroxide is included instead of a bromine-based flame retardant, which is effective in responding to legal regulations anticipated in the future.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method for manufacturing flame retardant polyurethane (PU) artificial leather comprising:
preparing a microfiber nonwoven fabric material;
consecutively forming a polyurethane coating layer and an adhesive layer on one surface of a release paper; and
combining the nonwoven fabric material and the release paper,
wherein the preparing step of the microfiber nonwoven fabric material comprises impregnating a nonwoven fabric into a polyurethane resin comprising a first flame retardant; and treating the impregnated nonwoven fabric with an alkali solvent to reduce the weight.

2. The method for manufacturing flame retardant PU artificial leather of claim 1, wherein the polyurethane resin comprises the first flame retardant in greater than or equal to 40 parts per hundred parts of resin (PHR) and less than 50 PHR.

3. The method for manufacturing flame retardant PU artificial leather of claim 2, wherein the first flame retardant is aluminum hydroxide ($Al(OH)_3$).

4. The method for manufacturing flame retardant PU artificial leather of claim 1, wherein the adhesive layer comprises a second flame retardant in 20 PHR or greater.

5. The method for manufacturing flame retardant PU artificial leather of claim 4, wherein the second flame retardant is a phosphorous-based flame retardant.

6. The method for manufacturing flame retardant PU artificial leather of claim 5, wherein the second flame retardant is a non-soluble flame retardant having phosphorous content of 10% by weight or higher and alkalinity resistance of 60% or higher.

7. The method for manufacturing flame retardant PU artificial leather of claim 6, wherein the second flame retardant is a powder-type flame retardant.

8. The method for manufacturing flame retardant PU artificial leather of claim 5, wherein the second flame retardant is bis-amide phosphate.

* * * * *

UNITED STATES PATENT AND TRADEMARK OFFICE
CERTIFICATE OF CORRECTION

PATENT NO. : 10,640,646 B2
APPLICATION NO. : 15/858554
DATED : May 5, 2020
INVENTOR(S) : Hye-Na Hwang et al.

It is certified that error appears in the above-identified patent and that said Letters Patent is hereby corrected as shown below:

On the Title Page

Item (73) Assignees, please delete:
"Baiksan Co., Ltd., Siheung-si (KR)."

Signed and Sealed this
Fifteenth Day of December, 2020

Andrei Iancu
*Director of the United States Patent and Trademark Office*